United States Patent

Hayashi et al.

Patent Number: 6,024,673
Date of Patent: Feb. 15, 2000

[54] AUTOMATIC CLUTCH CONTROL FOR COASTING WITH BRAKE-CONDITION RESPONSIVE HYSTERESIS WIDTH

[75] Inventors: Masahiko Hayashi, Fujisawa; Kuzuhiko Kobayashi; Hiroyuki Arai, both of Kawasaki, all of Japan

[73] Assignees: Isuzu Motors Limited, Tokyo; Transtron, Inc., Kanagawa, both of Japan

[21] Appl. No.: 09/253,520

[22] Filed: Feb. 19, 1999

[30] Foreign Application Priority Data

Feb. 23, 1998 [JP] Japan ................................ 10-058868

[51] Int. Cl.$^7$ ............................ B60K 41/24; B60K 41/28
[52] U.S. Cl. ........................ 477/171; 477/175; 192/13 R; 192/3.63
[58] Field of Search ..................... 477/170, 171, 477/166, 175, 180, 71, 74; 192/3.58, 13 R, 3.63

[56] References Cited

U.S. PATENT DOCUMENTS 4,838,397  6/1989  Kurihara et al. ..................... 477/74 X
5,484,353  1/1996  Lux et al. ........................... 477/175 X

*Primary Examiner*—Charles A. Marmor
*Assistant Examiner*—Ankur Parekh
*Attorney, Agent, or Firm*—Rabin & Champagne, PC

[57] ABSTRACT

In a vehicle with an automatically controlled clutch in which ON-OFF of the friction clutch is automatically controlled by a controller, clutch control during coasting (with the accelerator depression amount being 0%) is conducted according to a clutch ON-OFF map for coasting provided in the controller.

Two different clutch ON-OFF maps for coasting are provided; one having a smaller hysteresis width, and the other having a larger hysteresis width. Clutch control during coasting is conducted by applying the map with a smaller hysteresis width when the brake pedal is stepped on or applying the map with a larger hysteresis width when the brake pedal is not stepped on. Thus, clutch ON-OFF hunting can be avoided, and smooth stopping can be conducted.

1 Claim, 3 Drawing Sheets

6,024,673

AUTOMATIC CLUTCH CONTROL FOR COASTING WITH BRAKE-CONDITION RESPONSIVE HYSTERESIS WIDTH

FIELD OF THE INVENTION

This invention relates to a vehicle with an automatically controlled clutch, in which ON-OFF of the clutch is automatically controlled through commands from the controller.

BACKGROUND OF THE INVENTION

Uaually, vehicles are equipped with a friction clutch as a clutch itself and, in some vehicles, the clutch is not controlled by manual operation but is automatically controlled through signals output from a cotroller or is controlled either maually or automatically. In this specification, vehicles which allows the clutch to be controlled at least automatically are referred to as vehicles with an automatically controlled clutch.

FIG. 5 is a block diagram showing a conventionl vehicle with an automatically controlled clutch. In FIG. 5, numeral 1 designates a gear lever, 2 a clutch controlling change switch, 3 a brake switch, 3A a parking brake switch, 4 a brake pedal, 4A a parking brake, 5 a controller, 5-1 a clutch ON-Off map to be applied while coasting, 6 a clutch pedal sensor, 7 a clutch pedal, 8 a master cylinder, 9 an accelerator pedal depression amount sensor, 10 an accelerator pedal, 11 an engine, 12 an engine rotation sensor, 13 a clutch, 14 a gear shift position sensor, 15 a release fork, 16 a transmission, 17 a transmission rotation sensor, 18 a pressure oil pipe, 19 a hydraulic clutch actuator, 20 a sleeve cylinder, 21 a rod, and 22 a clutch pedal position sensor.

Additionally, the vehicle with an automatically controlled clutch illustrated here enables one to control the clutch either maually or automatically.

The brake switch 3, parking brake switch 3A, clutch pedal position sensor 6, and accelerator pedal depression amount sensor 9 respectively detect whether corresponding pedals are operated or not, or detect the amount of depression of corresponding pedals. The detected signals are input to the controller 5.

The gear shift position sensor 14 detects the position of gear shift in the transmission 16, and the clutch position sensor 22 detects the clutch position between ON and OFF positions(clutch stroke). The transmission rotation sensor 17 detects rotation number of the counter shaft of the trnsmission 16. Vehicle speed can be determined by converting the rotation number taking into consideration gear ratio and the like. (In this case, the transmission rotation sensor 17 is used as a vehicle speed sensor.) Detected signals from these sensors are also input to the controller 5. The controller 5 is constituted based on computer technology.

The hydraulic clutch actuator 19 is an actuator which controls ON-OFF of the clutch based on the control signal output from the controller 5. The clutch 13 is constituted so that it can be either automatically controlled through the signal from the controller 5 or manually controlled by means of the clutch pedal 7. For this purpose, the hydraulic clutch actuator 19 is positioned on the way of the hydraulic pipe 18 between the master cylinder 8 of the clutch pedal 7 and the sleeve cylinder 20 of the clutch 13.

The clutch controlling change switch 2 is a switch which is switched on the side of the mode of automatically controlling the clutch 13 or on the side of the maually controlling mode (through the clutch pedal 7). When the switch 2 is on the side of the manually controlling mode, hydraulic pressure generated from the action of the clutch pedal 7 is conducted to the sleeve cylinder 20. When on the side of the automatically controlling mode, a pump and the like (not shown) inside the hydraulic clutch actuator 19 are co-operated by the signal output from the controller 5, and the hydraulic pressure thus generated is conducted to the sleeve cylinder 20. (In this case, even when the clutch pedal 7 is footed, no hydraulic pressure is conducted to the sleeve cylinder 20.)

Additionally, some vehicles with the automatically controlled clutch have a gear lever 1 having a switch within its knob. The switch functions so that, when a driver applies pressure to the gear lever 1 for shifting the gear, it is switched on to detect the intention of the driver. When the ON signal of the switch is input to the controller 5, the clutch 13 is let out (OFF) in preparation for a gear shift, then the gear is actually shifted.

When such vehicles with an automatically controlled clutch are parked on a downhill road (the engine rotating with the clutch OFF) with the gear shift position being in a driving position and not in a neutral position are released from brake-parked state, they start going downhill even without stepping on the accelerator pedal 10. As the vehicle speed reaches the preset level value (=preset level value for switching the clutch ON), the clutch 13 is switched ON according to the signal from the controller 5, thus engine brake begins functioning. As a result, the vehicle speed is decreased.

If the engine brake is so strong that the vehicle speed is decreased to another preset level (=preset level value for switching the clutch OFF), the clutch 13 is switched OFF. Otherwise, the engine could stop in some cases.

Driving without stepping on the accelerator pedal 10 (i.e., depression amount of the accelerator pedal=0%) is called coasting. In order to control the clutch during coasting, vehicles with the automatically controlled clutch have the above-described preset level value for switching the clutch ON and the preset level value for switching the clutch OFF, with some hysteresis between the two ON and OFF level values.

FIG. 2 is a graph illustrating the hysteresis in controlling ON-OFF of the clutch. When vehicle speed of a vehicle with the clutch off is increased to the clutch-ON level $V_2$, the clutch is switched ON. When vehicle speed of a vehicle with the clutch on is decreased to the clutch-OFF level value $V_1$ the clutch is switched OFF.

The difference between the clutch-OFF level value $V_1$ and the clutch-ON level value $V_2$, H, is a width of hysteresis. If the hysteresis width is too narrow, ON-OFF of the clutch will be repeated too often. That is, so-called "clutch ON-OFF hunting" takes place. To avoid this, width of the hysteresis is generally adjusted to be large enough.

Such clutch-OFF level values and clutch-ON level values are preset for respective gear stages for controlling the clutch during coasting. They are provided in the controller 5 as a map 5-1 for switching the clutch ON or OFF during coasting.

FIG. 3 is a graph showing a conventional map for switching the clutch ON or OFF during coasting, with the gear stage as abscissa and the vehicle speed as ordinate. Curve (a) shows vehicle speed on the way of increasing at which the clutch is switched ON and Curve (b) shows vehicle speed on the way of decreasing at which the clutch is switched OFF. The difference between the curves (a) and (b) in the ordinate direction represents the hysteresis width.

To describe the clutch control specifically taking the case where a vehicle is driven in a coasting state with the gear stage at the 4th stage, the clutch will be switched ON when the vehicle speed increases to point A, whereas the clutch will be switched OFF when the speed decreases to point B.

Additionally, as conventional literature relating to the vehicle with automatically controlled clutch, there is illustrated, for example, Japanese Unexamined Utility Model No.H6-8825.

However, there has been a problem that, if the clutch OFF level value is set at a lower level in order to widen the hysteresis width for avoiding the clutch ON-OFF hunting as much as possible during coasting, the above-described conventional vehicles with automatically controlled clutch cannot be smoothly stopped.

More detailed description of the problem is as follows. In setting the clutch OFF level value at a lower level for widening the hysteresis width, the engine would stall if the level will be lower than the minimum vehicle speed for keeping the idling of engine, thus naturally the level not being set at a level lower than that. However, it is possible to set the level at an extremely near level larger than that.

If the clutch OFF level is set at such a low level, the clutch will not be easily switched OFF when the brake pedal 4 is stepped on to stop the vehicle, thus the vehicle continuously receiving the driving force of engine to keep moving. Therefore, a strong stepping force on the brake pedal 4 must be kept to stop the vehicle at an intended stopping position, thus smooth stopping having been impossible.

The subject of the present invention is to solve the above-described problem.

SUMMARY OF THE INVENTION

The first subject of the invention is to avoid clutch ON-OFF hunting while a vehicle with an automatically controlled clutch is coasting. The second subject of the invention is to realize that upon stopping the vehicle by stepping on the brake pedal, the clutch is switched OFF earlier to cut the driving force of engine so the vehicle can be stopped smoothly.

In order to solve the aforesaid subjects, it is intended in the present invention that, in a vehicle equipped with a gear position sensor, a vehicle speed sensor, a brake switch, an accelerator pedal depression amount sensor, a vehicle-controlling controller, and a friction clutch automatically ON-OFF controlled through the controller, the controller has two kinds of clutch ON-OFF maps with different hysteresis widths to be applied for controlling the clutch while coasting, one map with a smaller hysteresis width intended to be applied while stepping on a brake pedal during coasting and the other map with a larger hysteresis intended to be applied while not stepping on a brake pedal.

BEST MODE FOR PRACTICING THE INVENTION

The present invention will now be described in more detail by reference to the drawings.

Figure 5:
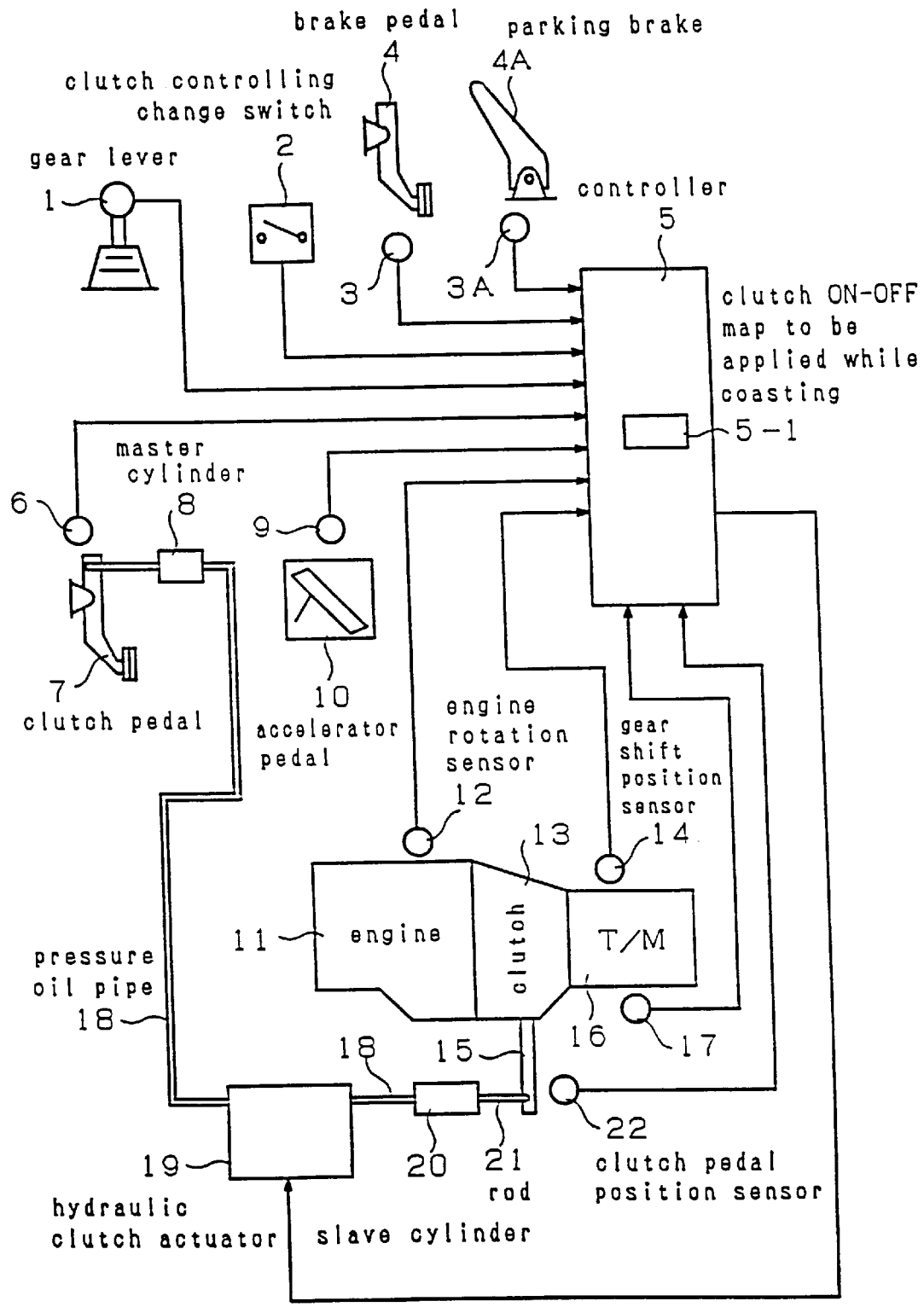
FIG. 5 is a block diagram which shows a conventional vehicle with an automatically controlled clutch.

The block diagram of the vehicle of the present invention with an automatically controlled clutch is the same as shown by FIG. 5, except that two kinds of maps are provided as the clutch ON-OFF map 5-1 to be applied during coasting. That is, one map has a smaller hysteresis width, and the other has a larger hysteresis width. It may also be possible to use a conventionally used map as a map with a smaller hysteresis width and newly provide a map with a larger hysteresis width.

Figure 3:
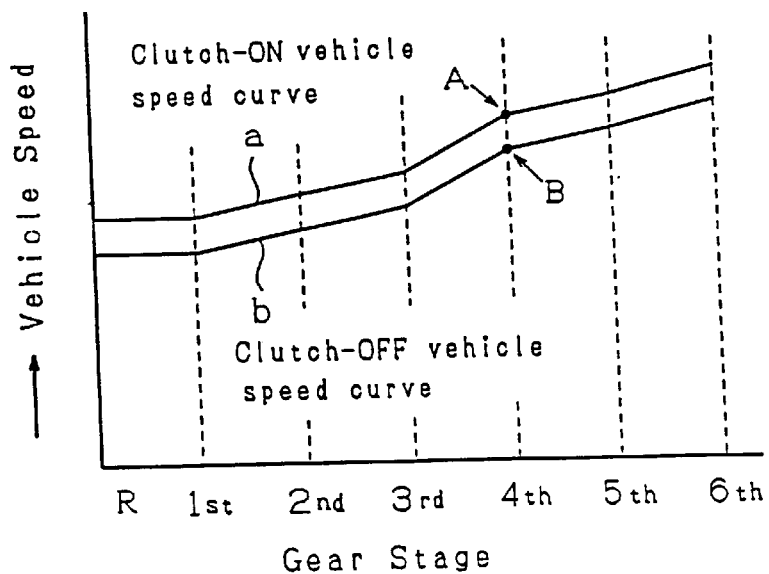
FIG. 3 is a graph which shows a conventional clutch ON-OFF map to be applied during coasting.
Figure 4:
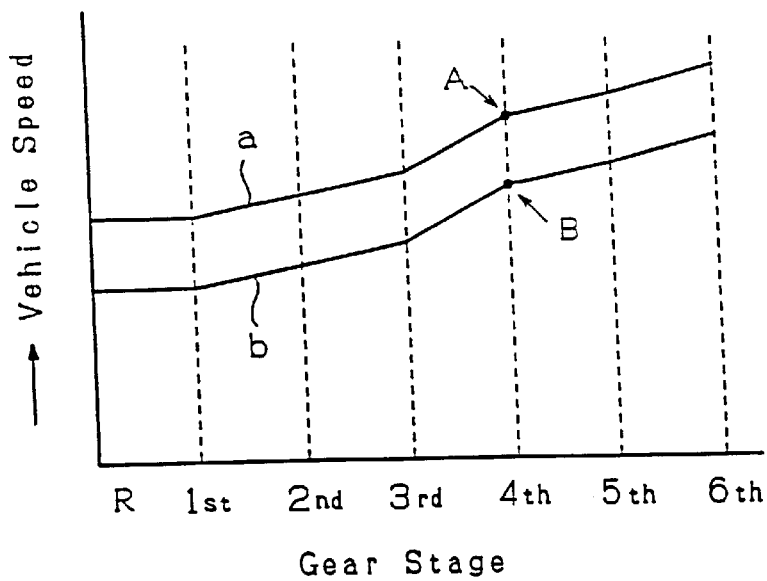
FIG. 4 is a graph which shows the clutch ON-OFF map of the present invention with a larger hysteresis width to be applied during coasting.

FIG. 4 is a graph showing the clutch ON-OFF map of the present invention having a larger hysteresis width to be applied during coasting. In comparison with that shown in FIG. 3, the gap between the curves (a) and (b) in the ordinate direction is larger, which means that the hysteresis width is larger.

Figure 1:
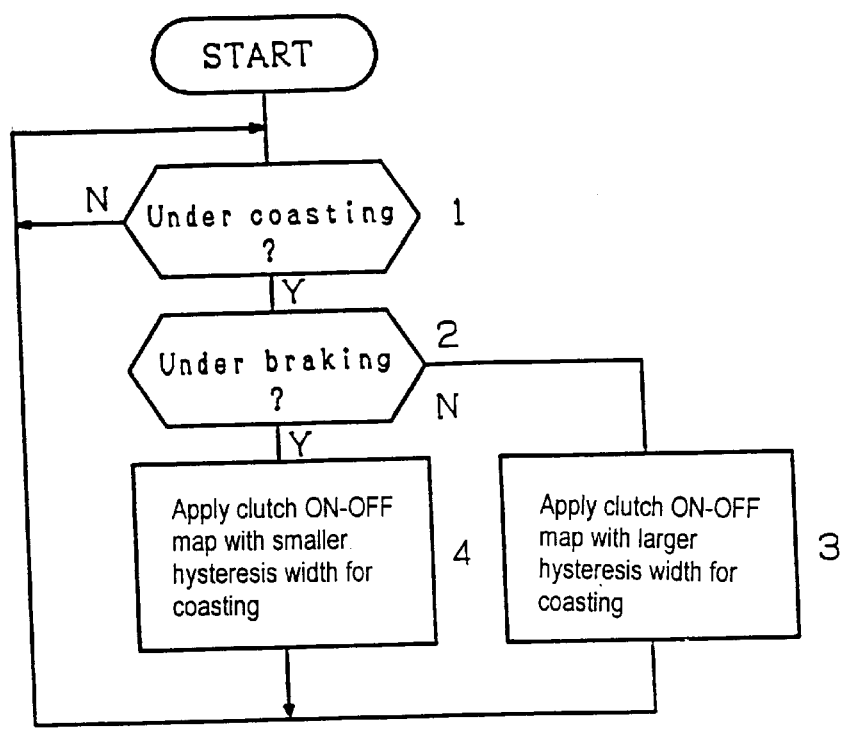
FIG. 1 is a flow chart which illustrates clutch control of the present invention during coasting.
Figure 2:
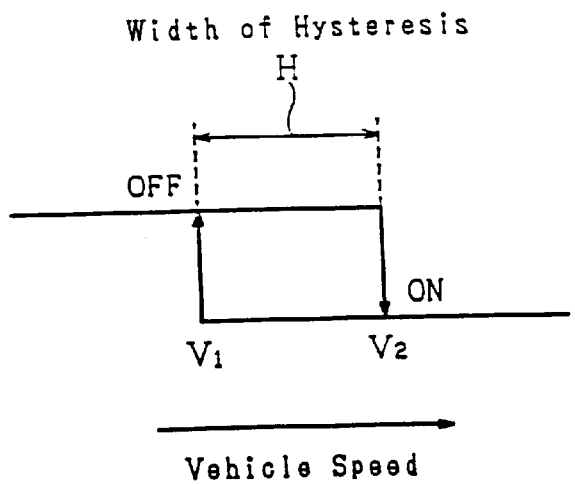
FIG. 2 is a graph which shows hysteresis in controlling ON-OFF of clutch.

FIG. 1 is a flow chart illustrating how to control the clutch during coasting according to the present invention. This control is conducted within the controller 5.

Step 1 . . . Check whether the vehicle is under coasting or not (i.e., being driven with 0% of accelerator pedal depression amount or not) and, if not, return to the start. This is checked based on the detection signal from the accelerator pedal 10, the detection signal from the transmission rotation sensor 17 (utilizing as a vehicle speed sensor), and the like.

Step 2 . . . Check whether the brake pedal 4 is stepped on or not. This is checked based on the detection signal from the brake switch 3.

Step 3 . . . If the brake pedal 4 is not stepped on, the clutch ON-OFF control is conducted by applying the clutch ON-OFF map for coasting with a larger hysteresis width. Thus, clutch ON-OFF hunting can be avoided. Since the brake pedal 4 is not stepped on, the driver does not want to stop the vehicle. Therefore, even when the vehicle speed is as slow as immediately before stopping, it does not matter that the clutch is in the ON state and the vehicle receives the driving force from the engine.

Accordingly, the lower limit of the hysteresis width may be slightly larger than the vehicle speed corresponding to idling rotation.

Step 4 . . . If the brake 4 is stepped on, the clutch ON-OFF control is conducted by applying the clutch ON-OFF map for coasting with a smaller hysteresis width. Since the brake pedal 4 is stepped on, the driver wants to stop the vehicle. In such a case, application of the map with the smaller hysteresis width causes earlier clutch OFF operation, thus coasting by the driving force of engine not being continued for a long time. Thus, it is not necessary to keep a strong stepping force on the brake pedal 4 till immediately before the vehicle being stopped at the intended position.

Additionally, in the above-described embodiment, description has been given taking the vehicle whose clutch can be controlled either manually or automatically as the vehicle with an automatically controlled clutch but, needless to say, the same applies to vehicles whose clutch can be only automatically controlled.

This application claims the priority benefits of Japanese patent application number H 10-58868, filed on Feb. 23, 1998, the disclosure of which is incorporated herein by reference.

What is claimed is:

1. Automatic clutch control system for a vehicle comprising; a gear position sensor, a vehicle speed sensor, a brake switch, an accelerator pedal depression amount sensor, a vehicle-controlling controller, and a friction clutch automatically ON-OFF controlled through the controller, in which the controller has two kinds of clutch ON-OFF maps with different hysteresis widths to be applied for controlling the clutch while coasting, one map with a smaller hysteresis width being applied while on a brake pedal is stepped on during coasting and the other map with a larger hysteresis width being applied while said brake pedal is not stepped on during coasting.

* * * * *